Feb. 16, 1926.
1,573,177
W. McCOMB ET AL
PROCESS FOR THE STERILIZATION AND CLARIFICATION OF LIQUIDS
Filed April 6, 1922

Patented Feb. 16, 1926.

1,573,177

UNITED STATES PATENT OFFICE.

WILLIAM McCOMB, OF NEW YORK, N. Y., AND WILBERT A. HEYMAN, OF HABANA, CUBA.

PROCESS FOR THE STERILIZATION AND CLARIFICATION OF LIQUIDS.

Application filed April 6, 1922. Serial No. 550,012.

*To all whom it may concern:*

Be it known that we, WILLIAM McCOMB and WILBERT A. HEYMAN, residing, respectively, at New York, in the county and State of New York, and at Habana, Cuba, have invented certain new and useful Improvements in a Process for the Sterilization and Clarification of Liquids, of which the following is a specification.

This invention relates to improvements in processes for the treatment of liquids with a view to producing sterilization. The process herein set forth makes it possible to sterilize such liquids and in some cases to clarify the fluid under treatment at the same time, the invention being applicable in the preparation and preservation of fruit juices, and being useful also in the treatment of milk and other liquids of organic origin. In the case of fruit juices, the process makes it possible to preserve the juice in its original condition—that is—without the destruction or transformation of those constituents which are of a delicate and volatile character, and in the case of milk and other products of that kind, the process makes inactive or kills the bacteria contained therein without producing injurious effects on the vitamine content.

It will be understood that certain liquids to be preserved contain bacteria which, allowed to remain active, would result in fermentation, accompanied by chemical changes resulting in the formation of undesirable or deleterious products. Such bacteria may be killed or made inactive by the application of heat, the simplest sterilization processes consisting in raising the temperature of the liquid to a point at which the destruction takes place, continuing the heating for a period of time and then slowly cooling. In the case of milk, for instance, the temperature is about 145° F., the heating being continued for such a period of time, as may be required. Sterilization or pasteurization processes have also been found to be favorably affected by carrying on the heating under pressure, and with the time element constant, the destruction or making dormant of the undesirable bacteria is accomplished at lower temperatures in the presence of pressure. The effect of pressure may also be taken advantage of by raising the liquid to the usual temperatures employed in carrying on the processes at atmospheric pressure, when it will be found that increased pressure hastens the destruction materially.

It is a well known fact also that the destruction of such injurious bacteria may be materially aided by sudden changes in temperature conditions in the liquid. For instance, a rapid rise in the temperature of the liquid followed by a sudden and rapid lowering in temperature produces a more complete sterilization than is possible when the changes occur gradually, there being a shock effect which is most effective in the destruction of fermentive and putrefactive bacteria.

In the case of various liquids containing delicate flavoring or odoriferous principles, it is well known that many such constituents are of a volatile or unstable character, so that the application of heat in the open air will in most instances, result in the driving off of the desirable elements or else in the oxidation of such compounds by combination with the oxygen of the atmosphere. As the peculiar and characteristic odors and flavors of most fruit juices are due to such volatile and readily oxidizable constituents, it will be seen that the necessary sterilization must be carried on with unusual care. By the use of the process herein described, however, the liquid is heated, without contact with air and oxidation is therefore prevented. Loss by volatilization is also prevented and it is not necessary to provide an elaborate system of vacuum apparatus to accomplish the desired results.

It has been discovered—see Science N. S. Vol. L III, No. 1375, p. 446—that milk treated by the usual pasteurization processes is found to lose much of its nutritive and anti-scorbutic properties, the experiments indicating that the result was due to oxidation induced by agitation. When the liquid was agitated rapidly the loss was most marked, but merely bubbling air through the liquid caused a destruction of some of these valuable properties. The same destructive action relative to anti-scorbutic properties is found to take place in the case of orange juice when sterilization is carried on under conditions that favor oxidation and as pointed out in the article referred to, oxidation appears to be a factor which should be controlled and prevented in so far as possible, when the nutritive qualities of the liquid treated are to be preserved The object of this invention, therefore, is to provide a more efficient and rapid method of liquid sterilization.

A further object is to provide a process for the treatment of liquids by which such liquids may be sterilized and clarified by the one operation.

Another object of this invention is to provide a process for sterilization by which all the nutritive and anti-scorbutic properties of the liquid may be retained, while the harmful bacteria are destroyed.

Another object is to provide a process of sterilization by which the destruction of the harmful ingredients may be carried on without oxidation.

Another object is to provide a process of sterilization and clarification in which the harmful elements in the liquid under treatment may be destroyed without agitation and the accompanying oxidation.

Another object of the invention is to provide a process of liquid treatment which shall take advantage of the shock effect resulting from sudden changes in temperature conditions.

Still another object of this invention is to provide a process of liquid treatment which shall be useful to destroy fermentive and putrefactive bacteria while at the same time preserving all the volatile constituents of the product undergoing treatment.

A further object of the invention is to provide a process by which the sterilization and clarification of liquids may be cheaply and rapidly carried on and without the breaking down of any essential ingredients contained therein.

Other objects and aims of the invention more or less specific than those referred to above, will be in part obvious and in part pointed out in the course of the following description of the steps and the relation of each step to one or more of the others thereof employed in carrying out our process, and the scope of protection contemplated will be indicated in the appended claims.

For a clearer understanding of the process reference is made to the accompanying sheet of drawings in which similar reference characters refer to similar parts. In the figures there is shown apparatus suitable for carrying on the new process.

Figure 1:
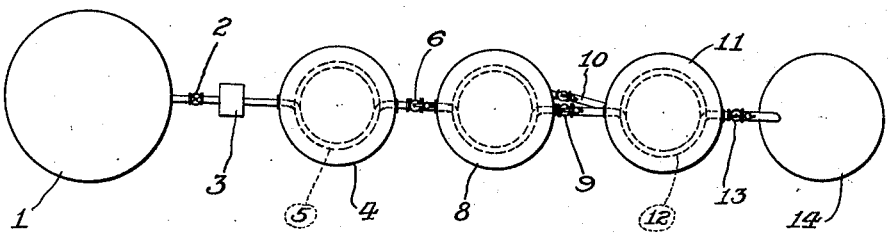
Figure 1 shows a plan view of such apparatus.
Figure 2:
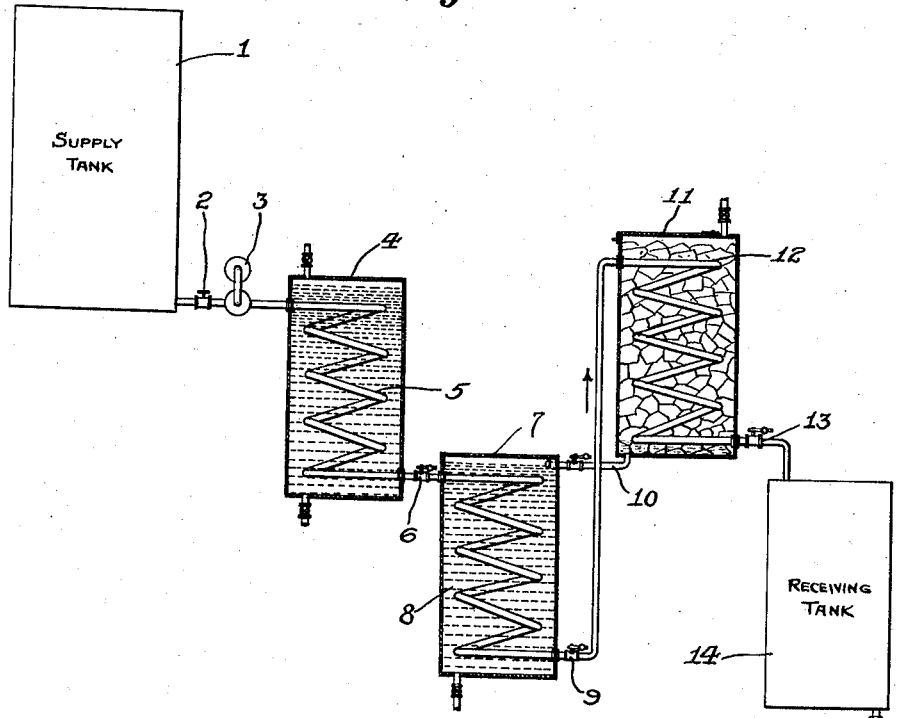
Figure 2 shows an elevation with parts in section.

In carrying out the process, the liquid to be treated is placed in a supply tank 1, provided with an outlet pipe near the bottom. In this outlet pipe there is a shut-off valve 3 of the usual type. The fluid flows from the tank 1 through valve 2 into the receiver of a force pump 3, which may be of any suitable form, the pump being required for the purpose of forcing the liquid under pressure. From the pump 3, the liquid passes into a coil 5 which may be continuous or in one or more sections. The coil 5 is contained within a vessel 4, which is provided with inlet and outlet pipes through which a heating medium may be introduced so as to raise the temperature in the liquid contained in coil 5.

Outside vessel 4 and connected to the end of the coil 5, there is provided a pressure valve 6 of any well-known type for the purpose of offering resistance to the passage of liquid through coil 5 under the action of pump 3. It will be understood, that any means of exerting pressure on the liquid under treatment will serve in place of the pump, as for instance a pressure tank or other desired means. The temperature produced in the liquid in coil 5 is preferably about 140° F. for pasteurization processes and the liquid is under a pressure of about 25 lbs. per square inch.

From the heated coil 5 the liquid passes through a coil 8 contained within a vessel 7, which is supplied with a cooling liquid through an inlet pipe 10. The coil 8 is connected outside of vessel 7 with a reducing valve 9, so set as to maintain a pressure on the liquid in coil 8, considerably less than the pressure maintained in coil 5. In case of a pressure of 25 lbs. in coil 5, a pressure of about 10 lbs. on the liquid in coil 8 is preferred.

From valve 9, the liquid flows through a third coil 12, contained within a vessel 11, into which a cooling medium is introduced. Vessel 11 is provided with an inlet and outlet as shown, the outlet 10 being connected with the inlet of vessel 7, so that the cooling medium is utilized in two stages, being discharged finally from the vessel 7.

The pressure valves used are preferably of such type that the pressure of the liquid in the various coils may be regulated and the rate of flow of the liquid governed. If desired, pressure gauges may be inserted at various points between the pumping apparatus and the pressure valves. Suitable means may also be employed, if desired to maintain a constant pressure in the system, as for instance by the use of a pressure release valve located at the pump and set at a desired pressure with provision to return the surplus liquid to the supply tank.

From vessel 11, the treated liquid passes through a final reducing valve 13 set to maintain a relatively low pressure in coil 12, preferably about 5 lbs., and is finally discharged into a receiving tank 14, from which it may be withdrawn as needed.

It will be seen that in the process herein set forth the liquid is at no stage during the process exposed to the air, nor is it agitated. The heating and cooling takes place in closed coils and oxidation with its harmful effects is reduced to a minimum.

It will be appreciated that various forms of aparatus may be employed in carrying out the novel process and the claims are not to be limited to the forms herein shown. The essential features of the apparatus namely, the heating of the material under pressure, and the cooling of the heated material under relatively reduced pressure, may be carried out in various ways, as may be preferred, and the desired results may be attained by the use of other apparatus provided the various steps herein set forth and claimed, are followed.

Having thus described our invention, what we claim as new and desire to secure by Letters Patent is:

1. The herein described process of treating liquid, which consists in forcing liquid through a zone heated to a temperature of at least 145° F., then passing said liquid through a zone heated to a temperature of not over 70° F., and simultaneously reducing the pressure upon the liquid as it enters the cooler zone.

2. The herein described process of treating liquids, which consists in forcing the liquid through a zone heated to at least 145° F., and under a pressure of at least 200 pounds to the square inch, and then admitting the liquid into a zone heated to a temperature of not over 70° F., and simultaneously reducing the pressure thereon to a pressure not exceeding 25 pounds.

3. The herein described process of treating liquids, which consists in forcing the liquid through a zone heated to at least 145° F., and under a pressure of at least 200 pounds to the square inch, and then admitting the liquid into a zone heated to a temperature of not over 70° F., and simultaneously reducing the pressure thereon to a pressure not exceeding 25 pounds, and then finally introducing said liquid into a zone having a temperature not exceeding 36° F., and reducing the pressure upon said liquid to not more than atmospheric pressure.

In testimony whereof we affix our signatures.

WILLIAM McCOMB.
WILBERT ALBERT HEYMAN.